Jan. 6, 1959
C. W. VOGT
2,867,317
METHOD AND APPARATUS FOR PREVENTING SLIPPAGE OF
TAPE ROLLS AND RESULTING PRODUCT
Filed Sept. 21, 1953
2 Sheets-Sheet 1
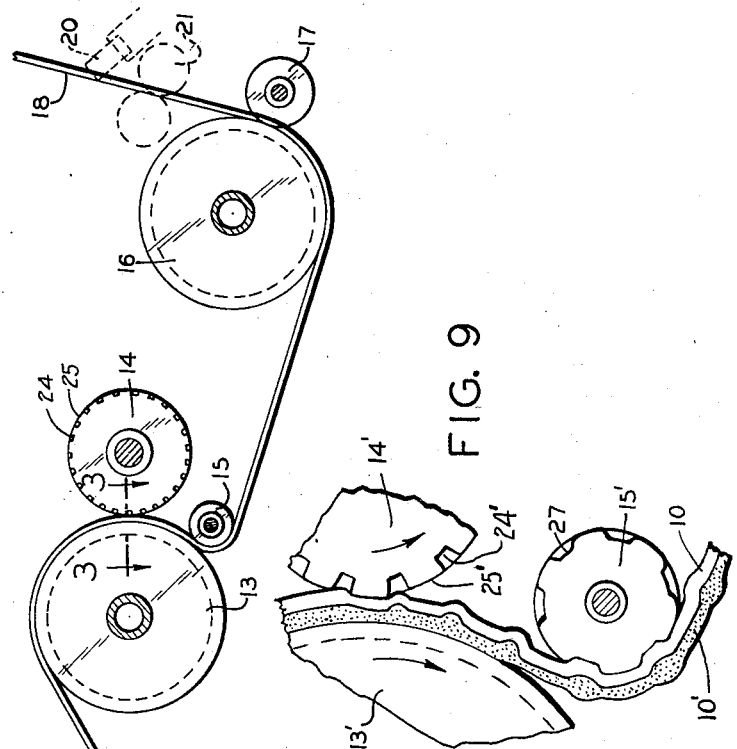
FIG. 1
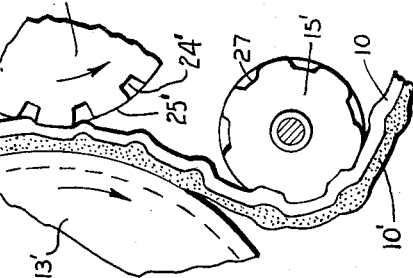
FIG. 9
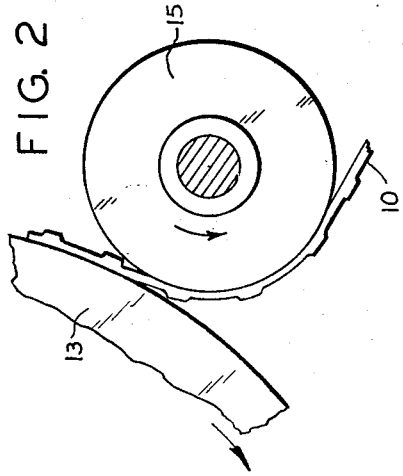
FIG. 2
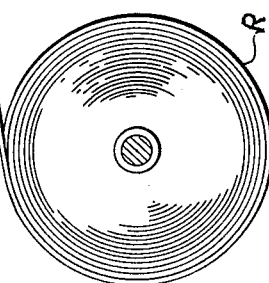
INVENTOR.
CLARENCE W. VOGT
BY
Campbell, Brumbaugh, Free & Graves
his ATTORNEYS.

Jan. 6, 1959     C. W. VOGT     2,867,317
METHOD AND APPARATUS FOR PREVENTING SLIPPAGE OF
TAPE ROLLS AND RESULTING PRODUCT
Filed Sept. 21, 1953     2 Sheets-Sheet 2
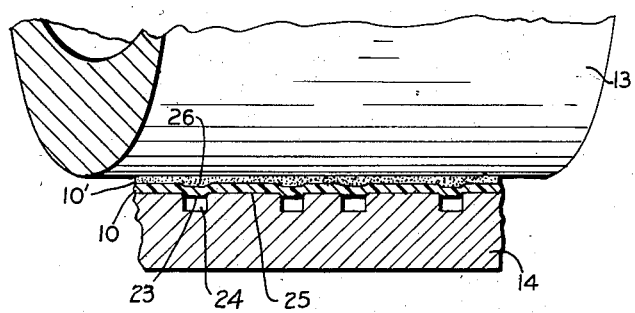
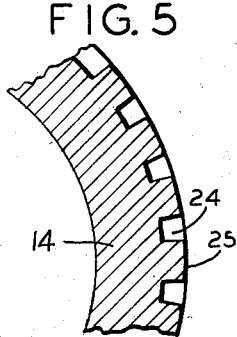
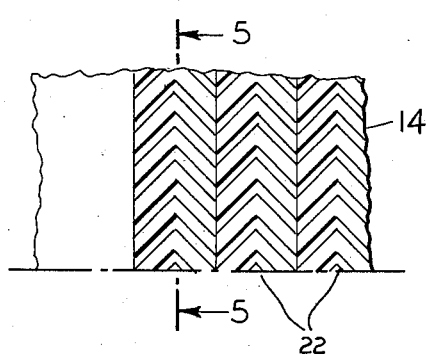
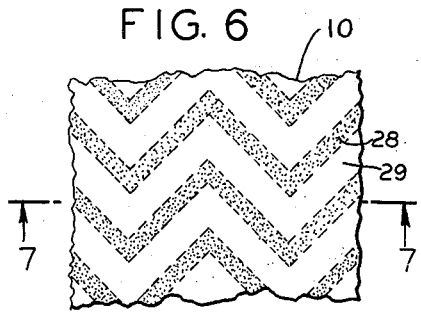
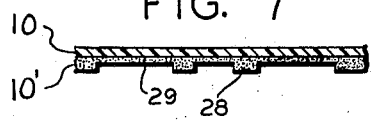
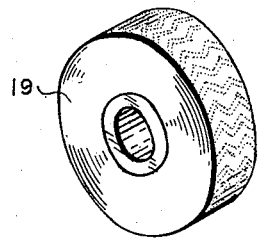
INVENTOR.
CLARENCE W. VOGT
BY
his ATTORNEYS.

United States Patent Office 2,867,317
Patented Jan. 6, 1959

2,867,317

METHOD AND APPARATUS FOR PREVENTING SLIPPAGE OF TAPE ROLLS AND RESULTING PRODUCT

Clarence W. Vogt, Norwalk, Conn.

Application September 21, 1953, Serial No. 381,285

7 Claims. (Cl. 206—59)

This invention relates to processes and apparatus for forming rolls of tape upon which adhesive material has been applied and embodies more particularly such a method and apparatus, as well as products made thereby, wherein the surface of the adhesive material is modified in shape to facilitate the smooth and even rolling thereof into rolls of desired length as well as to enhance the ability of the roll to remain in a desired condition wherein the respective edges of the convolutions of tape lie in the same parallel planes.

It has long been known that rolls of adhesive tape of the pressure sensitive type, such for example as tapes of the type commonly known as "Scotch tape," tend to become misshapen in that the convolutions of the rolls slip (that is, telescope) with respect to each other in an axial direction and thus expose portions of the adhesive and impair the use thereof. This tendency is increased in warm weather and limits the size of the rolls that are manufactured and sold.

In my copending application Serial No. 335,536, filed February 6, 1953, for "Weakened Edged Tape Rolls and the Like," I have described an apparatus and method, as well as the resulting product, wherein portions of the adhesive layer are redistributed or displaced, particularly adjacent the edges of the tape, thus to provide marginal regions wherein little or no adhesive material is present. In accordance with this invention, I propose to provide an apparatus and method (as well as the resulting product) wherein the layer of adhesive material is modified to prevent the side-wise slippage or telescoping hereinabove described.

A further object of the invention is to provide a method, apparatus, and product of the above character wherein side-wise seepage of adhesive as well as slippage of the convolutions is avoided.

These and other advantages are attained by modifying the layer of adhesive material in such fashion as to form in the outer surface thereof grooves or ridges at least certain of which lie at angles to others, or wherein certain portions of which lie at angles to other portions of the same groove or ridge as, for example, a formation such as a herringbone. I have discovered that grooves or ridges of this character serve effectively to prevent side-wise slippage of the respective convolutions of the rolls.

In order that the invention may be more fully understood, it will now be described with reference to the accompanying drawings, wherein:

Fig. 1 is a view in side elevation showing an apparatus by means of which adhesive tape may be formed in accordance with the present invention;

Fig. 2 is a partial view in detail showing the cooperating elements in Fig. 1 by means of which the design is reversed upon the adhesive tape;

Fig. 3 is a partial view in section, greatly enlarged, taken on the plane indicated by the line 3—3 of Fig. 1 and looking in the direction of the arrows, the back-up roll being illustrated in partial section;

Fig. 4 is a plan view of a portion of the surface of the design roller illustrated in Fig. 1;

Fig. 5 is a partial view in section, taken on the plane indicated by the line 5—5 of Fig. 4 and looking in the direction of the arrows;

Fig. 6 is a plan view of a portion of the band of material upon which adhesive material has been coated and which has been modified in accordance with the present invention;

Fig. 7 is a view in section, taken on the line 7—7 of Fig. 6 and looking in the direction of the arrows;

Fig. 8 is a perspective view illustrating a roll of adhesive tape formed in accordance with the present invention; and Fig. 9 is a view similar to Fig. 2 illustrating a modified form of guide roller.

Referring to the above drawings and particularly to Fig. 1, a band of material 10 is shown in the form of a roll R and preferably having a layer of adhesive material 10' (of pressure sensitive or other type) applied to one side of the band. It will be understood, of course, that the adhesive material may be applied to the band 10 before or after it is formed into the roll R. In any event, the band is directed over guide rollers 11 and 12 and to a heated back-up roller 13, the peripheral surface of which is properly spaced with respect to a design cylinder 14. The band of material 10 is directed to the back-up roller 13 in such fashion that the adhesively coated side thereof is in contact with the back-up roller 13 and, following contact with the back-up roller 13, the band of adhesive material is guided away from the back-up roller by means of a guide roller 15. From the roller 15, the material passes over a cooled back-up roller 16 in cooperation with which a cutting or slitting roller 17 may be used. In this fashion, the band is severed into a plurality of strips of adhesive tape, one of which is illustrated at 18, and, in accordance with conventional practice, these strips are rolled into suitable rolls such as illustrated at 19 in Fig. 8.

Instead of a roll slitter or cutter 17, as illustrated in solid lines in Fig. 1, the tape may be slit by means of a stationary knife edge 20 or by means of cooperating shear cutters 21, both of which are illustrated in dotted lines in Fig. 1.

The surface of the design roller 14 is provided with suitable configurations by means of which a suitable design or designs may be impressed upon the adhesive tape. As illustrated, a plurality of herringbone formations 22 (Fig. 4) are formed in the periphery of the roller 14, these formations being provided by ribs 25 with intervening grooves 24. As illustrated particularly in Fig. 3, the outermost peripheral surfaces of the back-up roller 13 and the outer surfaces of the ribs 25 on the design roller 14 are spaced apart a distance somewhat less than the combined thickness of the band of tape material 10 together with the thickness of the coating of adhesive material illustrated at 10' in Fig. 3. As a result, portions 23 of the band, together with portions 26 of the adhesive material, penetrate into the space provided by the grooves 24 during passage of the tape between the adjacent portions of the rollers 13 and 14.

As the tape leaves the back-up roller 13 and passes over the roller 15, it is subjected to some tension and, as a result, the design that is impressed into the band of tape material (as well as a portion of the adhesive) by means of the design roller 14 is at least partially inverted, as a result of which the obverse of the design will be formed in the layer of adhesive material, as shown in Fig. 2.

As illustrated in the form of the invention shown in Fig. 9, it may be found desirable to provide a guide roller 15' (receiving the modified tape material from between design roller 14' and back-up roller 13') with a peripheral design 27 that is similar to the design formed by the grooves 24' and ribs 25' in the design roller 14' in order to prevent the tension in the band of tape material from completely reversing the design and from flattening out the band of tape material as illustrated in Fig. 2. The precise dimensions required for any particular form of design are matters for computation in accordance with the peculiarities of the design selected and depend upon the extent of reversal of the design in the tape material and, therefore, need not be described in detail herein. It will be understood that in some cases also the herringbone or other keyed pattern may be substantially narrower and not, as shown in the drawing, extend to the side edges of tape.

Regardless of the precise structure of the cooperating rollers 13, 14 and 15, the design formed in the tape material by the design or pattern wheel 14, as above described, is illustrated in Fig. 6, wherein it will be seen that a herringbone formation is formed by the relatively thicker portions of adhesive 28, the intervening portions of adhesive 29 existing in the form of a thinner layer. Fig. 7 illustrates more precisely the nature of this structure.

In certain instances, it is found desirable to maintain the band of material against the back-up roller 13 for some distance following the point of impression. Under such conditions, the pattern is retained more fully than where the contact between the rollers 13 and 14 is merely tangential. In this connection it has been found that with tape materials having adhesives of the kind used on Scotch type of pressure-sensitive tapes, that desirable embossing or impression of the tape material is facilitated at temperatures between 150° to 190° F.; whereas, transfer of the adhesive to the back-up roller is substantially eliminated.

Under other circumstances, it may be desirable to have the back-up roller 13 heated to a higher temperature to enable it to remove portions of the adhesive, in which event a heated scraper or doctor blade (not shown) may be provided to remove such transfer adhesive material to prevent build-up thereof upon the roller 13. It will be understood, of course, that the adhesive material so transferred to the roller 13 may also be destroyed while upon the roller, if desired.

It has been found that rolls of adhesive tape formed in accordance with the present invention have substantially no tendency to telescope, that is, the respective convolutions of tape material do not slip axially with respect to each other. As hereinabove stated, a common tendency in rolls of tape material now available is to telescope, particularly in warm weather. There is also commonly experienced a difficulty with the undulating or irregular form of the convolutions in distances radially from the axis of the roll. These difficulties derive in part from variations in the gauge or thickness of the web; from variations in the thickness of the adhesive, and any irregularities resulting from lifting or cratering of the adhesive material. These difficulties are substantially eliminated by forming, in the adhesive material, a design such as that illustrated in the accompanying drawings. By providing formations or designs in the adhesive material in accordance with this invention, the successive convolutions are keyed together in such fashion that there is little or no tendency for the convolutions to telescope or slip with respect to each other.

I claim:

1. The method of forming rolls of adhesive tape having a plurality of nonslipping convolutions of tape sheet material, which comprises applying a continuous coating, nonuniform in thickness, of pressure-sensitive adhesive to a base tape material having portions displaced to provide for application of a different thickness of coating relative to the undisplaced portions, the displaced portions being in the form of zig-zag ridges on the side of the tape opposite the coating, and then raising the coating where the coating is thicker by smoothing out the displaced portions, and rolling the tape into a roll.

2. A method according to claim 1 wherein the zig-zag ridges are in herringbone formation.

3. A method according to claim 1 wherein the adhesive material is heated and maintained at an elevated temperature during application.

4. As an article of manufacture, a roll of adhesive tape having a plurality of nonslipping convolutions of tape sheet material, at least one surface of which has a continuous coating, nonuniform in thickness, of a pressure-sensitive adhesive thereon, the coating including thickened portions forming zig-zag ridges extending across the face of the tape.

5. An article of manufacture according to claim 4 wherein the zig-zag ridges have components that are symmetrical with respect to a plane that is perpendicular to the axis of the roll and intermediate the ends of the roll.

6. An article according to claim 4 wherein the zig-zag ridges lie at acute angles with respect to the plane perpendicular to the axis of the roll.

7. An article according to claim 4 wherein the zig-zag ridges are in herringbone formation.

References Cited in the file of this patent

UNITED STATES PATENTS

| | | |
|---|---|---|
| 853,094 | Leitch | May 7, 1907 |
| 1,755,818 | Ganzinotti | Apr. 22, 1930 |
| 1,760,820 | Drew | May 27, 1930 |
| 1,813,390 | Dwyer | July 7, 1931 |
| 2,205,564 | Johnstone | June 25, 1940 |
| 2,498,996 | McClure | Feb. 28, 1950 |
| 2,510,120 | Leander | June 6, 1950 |
| 2,750,030 | Tierney | June 12, 1956 |